(12) United States Patent
Kee

(10) Patent No.: US 12,270,464 B2
(45) Date of Patent: Apr. 8, 2025

(54) ASSEMBLY WITH RIVETED COMPONENTS

(71) Applicant: Schaeffler Technologies AG & Co. KG, Herzogenaurach (DE)

(72) Inventor: Noah Kee, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 202 days.

(21) Appl. No.: 18/204,542

(22) Filed: Jun. 1, 2023

(65) Prior Publication Data
US 2024/0401681 A1 Dec. 5, 2024

(51) Int. Cl.
*F16H 41/24* (2006.01)
*F16B 19/06* (2006.01)
*F16H 45/02* (2006.01)

(52) U.S. Cl.
CPC ............. *F16H 41/24* (2013.01); *F16B 19/06* (2013.01); *F16H 45/02* (2013.01)

(58) Field of Classification Search
CPC .......... F16H 41/24; F16H 45/02; F16D 33/18; F16B 19/06
See application file for complete search history.

(56) References Cited

U.S. PATENT DOCUMENTS

| | | | |
|---|---|---|---|
| 9,316,265 B2* | 4/2016 | Saiga | F16F 15/12353 |
| 11,181,176 B2* | 11/2021 | Angel | F16H 41/28 |
| 2021/0341021 A1* | 11/2021 | Edl | F16F 15/13171 |
| 2023/0067417 A1* | 3/2023 | Ahnert | F16F 15/1216 |

* cited by examiner

*Primary Examiner* — Huan Le
(74) *Attorney, Agent, or Firm* — Volpe Koenig

(57) ABSTRACT

A torque converter assembly including a hub and a housing at least partially surrounding the hub. The hub includes a hub body having a radially-inwardly extending circumferential slot defining a connection portion of the hub body, and a plurality of axially extending bores extending through the connection portion of the hub body to the circumferential slot. At least a portion of the housing is coupled to the hub with at least one rivet installed in a corresponding bore of the connection portion of the hub body.

13 Claims, 4 Drawing Sheets

ASSEMBLY WITH RIVETED COMPONENTS

TECHNICAL FIELD

The present disclosure is related to assemblies having components secured together with rivets, and is more particularly related to an assembly including blind rivets.

BACKGROUND

Rivets for connecting two or more components are well-known. In general, a rivet typically includes a head and a shank. The shank is received in bores of the components to be joined, and a tail end of the shank is deformed such that the rivet cannot be removed from the bores. For solid rivets, this requires access to both sides of the joint with the rivet being inserted from one side and the tail of the shank being deformed using rivet tooling on the other side of the joint.

Another type of rivet is a blind rivet. A blind rivet can be installed from a single side of a joint and is useful when there is limited or no access to the other side of the joint. Blind rivets are commonly referred to as pop rivets and generally include a two components—a mandrel and a sleeve. The mandrel is inserted in the sleeve and the sleeve is inserted into a hole in the joint from one side. The mandrel is then pulled through the sleeve from the same side of the joint using a pop rivet tool. As the mandrel is pulled through the sleeve, it expands the sleeve and creates a bulge on the backside of the joint.

Although pop rivets allow blind installation, they are not typically as durable or robust as solid rivets.

SUMMARY

In accordance with the present disclosure, a blind solid rivet connection is set forth. In one aspect, a first component and a second component are joined together with a rivet. At least one of the first component or second component includes a bore for receiving the rivet opening to a slot extending at least partially radially beyond the bore. A rivet is installed in the bore and an upset tail of the rivet is engaged with a surface of the slot. The upset tail of the rivet is formed by pressing the rivet against a corresponding surface of the slot.

According to one aspect, a torque converter assembly comprises a hub, and a housing at least partially surrounding the hub. The hub includes a hub body having a radially-inwardly extending circumferential slot defining a connection portion of the hub body, and a plurality of axially extending bores extending through the connection portion of the hub body to the circumferential slot. At least a portion of the housing is coupled to the hub with at least one rivet installed in a corresponding bore of the connection portion of the hub body.

The housing can include a pump housing and a cover, and the cover can be coupled to the hub. An upset tail of the at least one rivet can engage a surface of the circumferential slot. The hub body can have a uniform outer circumference and the bores can be spaced radially inwardly from the uniform outer circumference.

In accordance with another aspect, a hub for a torque converter comprises a hub body having a radially-inwardly extending circumferential slot defining a connection portion of the hub body, and a plurality of axially extending bores extending through the connection portion of the hub body to the circumferential slot. An axial end face of the hub body within the circumferential slot defines an upset surface against which a tail of a rivet can be compressed to deform the rivet tail within the circumferential slot.

The hub body can have a uniform outer circumference and the bores can be spaced radially inwardly from the uniform outer circumference.

In accordance with another aspect, a method of assembling a torque converter assembly comprises positioning at least a portion of a housing of the torque converter assembly adjacent a hub of the torque converter assembly, the hub including a hub body having a radially-inwardly extending circumferential slot defining a connection portion of the hub body, and a plurality of axially extending bores extending through the connection portion of the hub body to the circumferential slot, installing at least one rivet in a corresponding bore of the connection portion of the hub body, and pressing a tail of the at least one rivet against an axial end face of the hub body to upset the tail of the at least one rivet within the circumferential slot, whereby the at least a portion of the housing is coupled to the hub.

The at least one rivet can be integral with the at least a portion of the housing.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
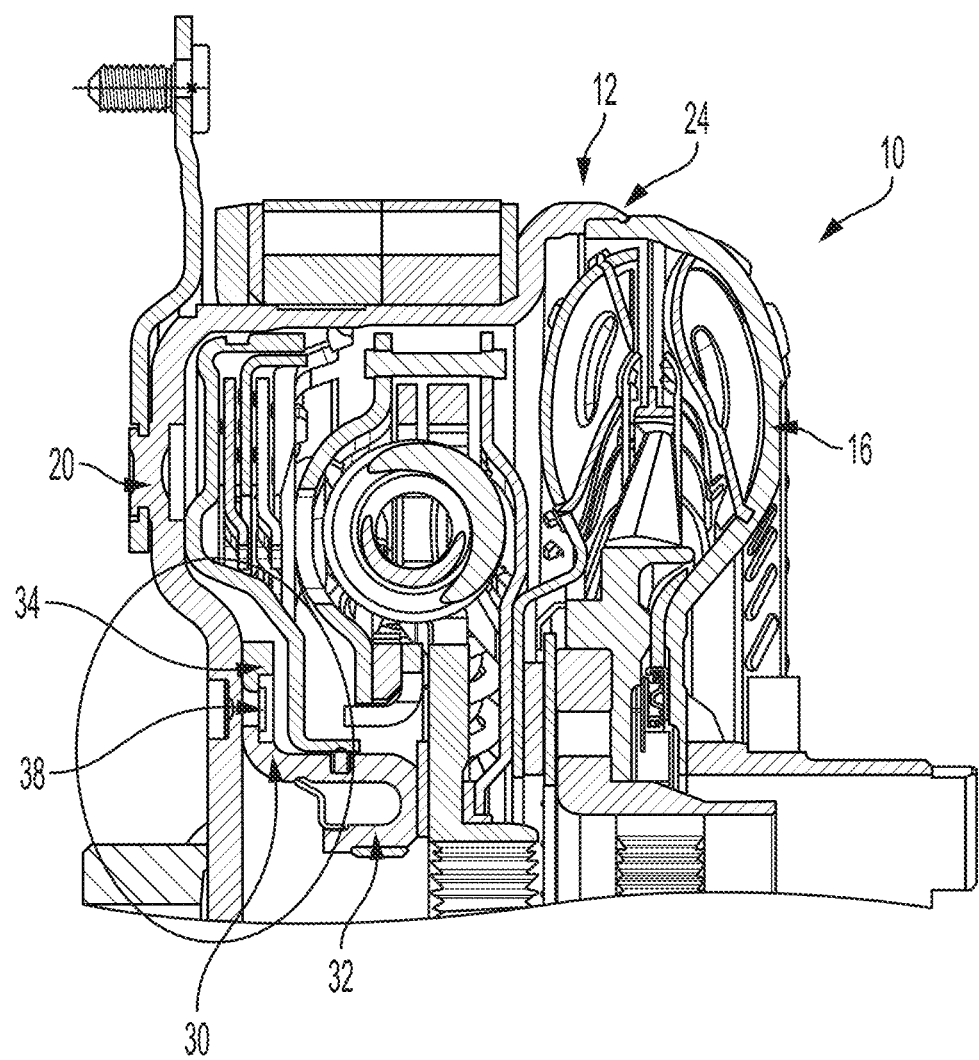
FIG. 1 is a cutaway view of a prior art torque converter.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The following description relates to a torque converter assembly, but it will be appreciated that aspects of the present disclosure can be employed in any application where components are to be joined together.

In FIG. 1, a torque converter assembly is illustrated and identified generally by reference numeral 10. The torque converter assembly 10 includes a variety of components (e.g., a pump, clutch, etc.) contained within a housing 12. The housing 12 is comprised of a pump housing 16 and a cover 20 that are joined together by a weld 24. As torque converters are well-known, additional details of the torque converter assembly 10 are not further described herein.

Figure 2:
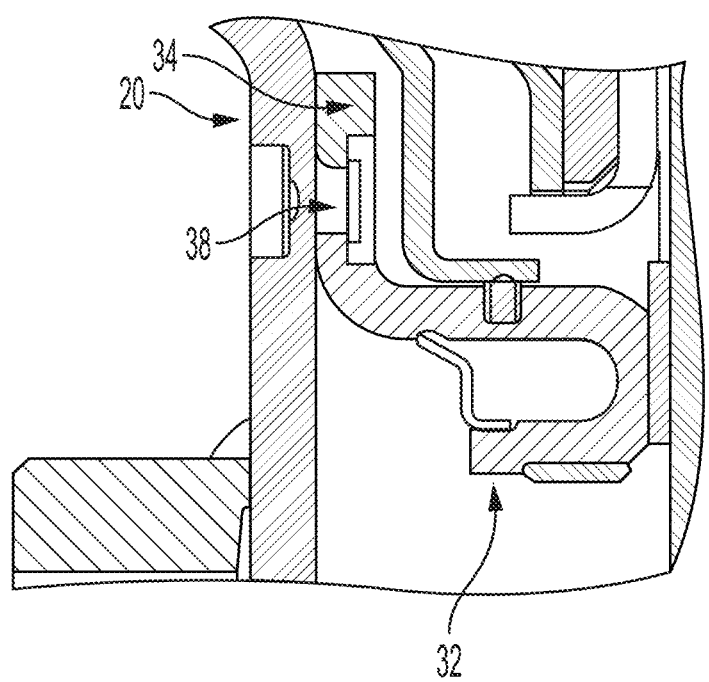
FIG. 2 is an enlarged portion of FIG. 1.

In the illustrated conventional arrangement of FIGS. 1 and 2, the hub 30 includes a generally cylindrical hub portion 32 having a radially-outwardly extending flange 34 with a plurality of circumferentially-spaced bores through which rivets 38 of the cover 20 extend. The rivets 38 are integrally formed with the cover 20. The flange 34 of the hub 30 is necessary to provide clearance for a riveting tool during installation of the rivets 38.

Figure 3:
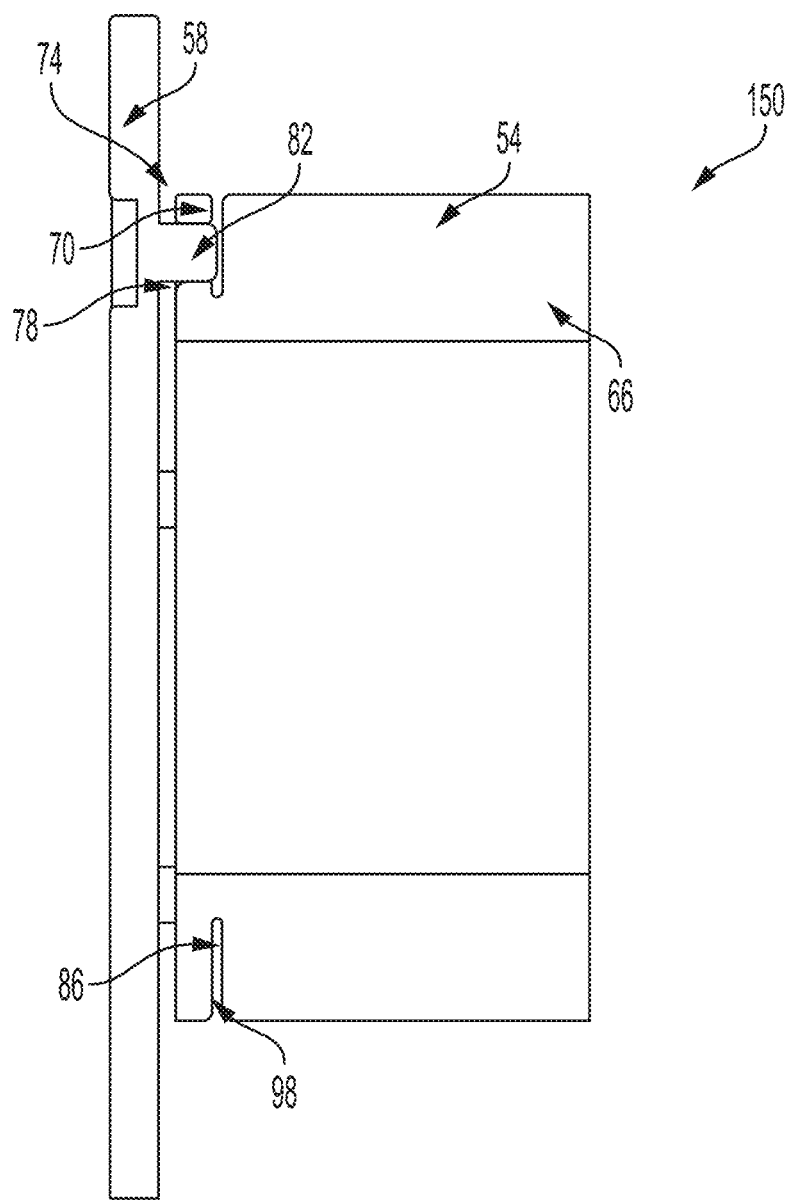
FIG. 3 is a cutaway view of an exemplary hub assembly in accordance with the present disclosure.

Turning to FIG. 3, and in accordance with the present disclosure, an exemplary assembly 50 for a torque converter includes a hub 54 and a cover 58. It will be appreciated that the assembly 50 can replace the hub and cover of the torque converter assembly 10 in FIGS. 1 and 2. The hub 54 includes a generally cylindrical hub body 62 defined by an axially extending circumferential wall 66. The circumferential wall 66 has a circumferential slot 70 defining a connection portion 74 of the hub body 62. A plurality of axially extending bores 78 are circumferentially-spaced around the connection portion 74, although only a single bore is evident in the cross-sectional view of FIG. 3. A plurality of integrally formed rivets 82 of the cover 58 extend through the bores 78. The rivets in FIG. 3 are shown prior to upset.

The rivets 82 are blind rivets installed from a single side of the hub 54. An axial end face 86 of the hub 54 acts as an upset surface and is utilized during installation of the rivets 82 to upset a tail 90 of each rivet 82. To this end, during installation of the rivets 82, the tails 90 are forced against the axial end face 86 and deformed or "mushroomed" such that the tails 90 can no longer pass through the bores 78 thereby securing the cover 58 to the hub 54. The upset tails 90 engage surfaces of the circumferential slot 70 surrounding the bores 78.

Figure 4:
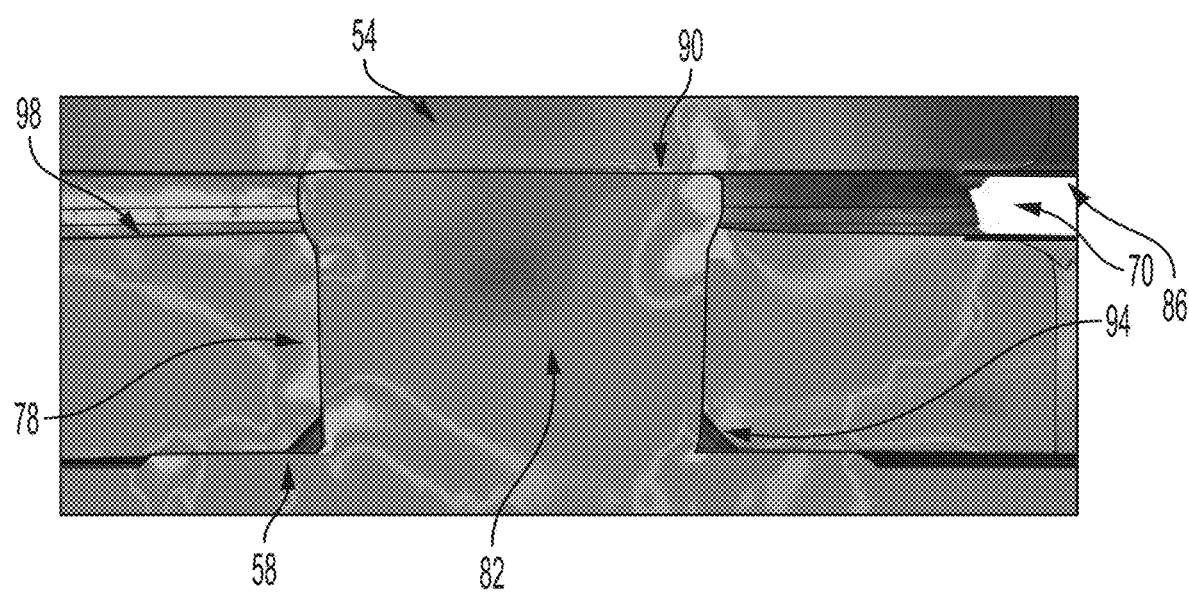
FIG. 4 is a cross sectional view of a rivet of the hub assembly of FIG. 3.

With additional reference to FIG. 4, a rivet 82 is shown in an installed state after its tail 90 is upset. The tail 90 has expanded radially within the circumferential slot 70 beyond the bore 78 thereby securing the cover 58 to the hub 54. To this end, the expanded tail 90 engages an axial end face 98 of the circumferential slot 70 opposite the axial end face 86. A chamfer 94, or angled surface, surrounding the bore 78 is provided to allow space for the rivet 82 to buckle during riveting. In some applications, the chamfer 94 is not provided.

Unlike the hub illustrated in FIGS. 1 and 2, the exemplary hub 54 can have a uniform circumference along its axial length because a radially extending flange is not required for rivet tooling access. In this regard, the hub body 62 acts as the rivet tooling and upsets the rivets 82 as the cover 58 and the hub 54 are pressed together. This may typically be performed using a press. By eliminating the radially extending flange the resulting assembly 50 of the present disclosure is lighter and more compact.

The circumferential slot 70 can have an axial width measured between the axial end faces 86 and 98 that corresponds to a calculated rivet upset height. In some applications, the upset diameter resulting can be smaller in diameter than would be expected under a normal rivet calculation. Accordingly, in some applications rivets having a slightly longer shank length can be used to achieve an expected upset diameter. In some embodiments, rivets having a shank length of 5 percent to 50 percent longer than a standard rivet are used. In some embodiments, the axial width of the circumferential slot measured between axial end faces 86 and 98 is less than a calculated rivet upset height such that at least a portion of the upset rivet tail 90 extends into the bore 78, as seen in FIG. 4.

The circumferential slot 70 can have a radial depth such that the slot extends radially inwardly beyond a radial extent of the bores 78. In general, the radial depth of the circumferential slot 70 will be sufficient to accommodate the upset diameter of the rivets.

Although this disclosure is shown and described in connection with rivets 82 that are integrally-formed with the cover 58, it will be appreciated that aspects of the disclosure are applicable to standard rivets (e.g., non-integrally-formed).

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10—torque converter assembly
12—housing
16—pump housing
20—cover
24—weld
30—hub
32—hub portion
34—flange
38—rivets
50—assembly
54—hub
58—cover
62—hub body
66—circumferential wall
70—circumferential slot
74—connection portion
78—bores
82—rivets
86—axial end face
90—tail
94—chamfer
98—axial end face

What is claimed is:

1. A torque converter assembly comprising:
a hub; and
a housing at least partially surrounding the hub;
wherein the hub includes a hub body having a radially-inwardly extending circumferential slot defining a connection portion of the hub body, and a plurality of axially extending bores extending through the connection portion of the hub body to the circumferential slot; and
wherein at least a portion of the housing is coupled to the hub with at least one rivet installed in a corresponding bore of the connection portion of the hub body.

2. The torque converter assembly according to claim 1, wherein the housing includes a pump housing and a cover, and wherein the cover is coupled to the hub.

3. The torque converter assembly according to claim 1, wherein an upset tail of the at least one rivet engages a surface of the circumferential slot.

4. The torque converter assembly according to claim 1, wherein the hub body has a uniform outer circumference and the bores are spaced radially inwardly from the uniform outer circumference.

5. The torque converter assembly according to claim 1, wherein a diameter of the hub body is the same on each axial side of the circumferential groove.

6. The torque converter assembly according to claim 1, wherein the circumferential slot has a radial depth greater than a radial extent of at least one of the plurality of axially extending bores.

7. The torque converter assembly according to claim 1, wherein the rivets are formed integrally with the portion of the housing coupled to the hub.

8. A hub for a torque converter comprising:
   a hub body having a radially-inwardly extending circumferential slot defining a connection portion of the hub body; and
   a plurality of axially extending bores extending through the connection portion of the hub body to the circumferential slot;
   wherein an axial end face of the hub body within the circumferential slot defines an upset surface against which a tail of a rivet can be compressed to deform the rivet tail within the circumferential slot.

9. The hub according to claim 8, wherein the hub body has a uniform outer circumference and the bores are spaced radially inwardly from the uniform outer circumference.

10. The hub according to claim 8, wherein a diameter of the hub body is the same on each axial side of the circumferential groove.

11. The hub according to claim 8, wherein the circumferential slot has a radial depth greater than a diameter of one of the plurality of axially extending bores.

12. A method of assembling a torque converter assembly comprising:
    positioning at least a portion of a housing of the torque converter assembly adjacent a hub of the torque converter assembly, the hub including a hub body having a radially-inwardly extending circumferential slot defining a connection portion of the hub body, and a plurality of axially extending bores extending through the connection portion of the hub body to the circumferential slot;
    installing at least one rivet in a corresponding bore of the connection portion of the hub body; and
    pressing a tail of the at least one rivet against an axial end face of the hub body to upset the tail of the at least one rivet within the circumferential slot;
    whereby the at least a portion of the housing is coupled to the hub.

13. The method according to claim 12, wherein the at least one rivet is integral with the at least a portion of the housing.

\* \* \* \* \*